Patented Dec. 11, 1928.

1,695,076

UNITED STATES PATENT OFFICE.

LUDWIG ALVINE ZOHE, OF SYRACUSE, NEW YORK.

LIQUID CONTAINER, NURSING BOTTLE.

Application filed October 13, 1925. Serial No. 62,239.

This invention has for its object a container for liquids by which the liquid flows out of the container when desired, by atmospheric pressure or other pressure not applied directly to the surface of the liquid, whereby the air does not come in contact with the liquid. The invention is particularly applicable for handling milk, so that it does not come in contact with the air, and hence not contaminated by the air, and is especially adaptable for nursing bottles for babies, whereby the milk will flow from any level or position to the nipple in the baby's mouth when the baby sucks on the nipple.

The invention consists in the novel features and in the combinations and constructions hereinafter set forth and claimed.

In describing this invention, reference is had to the accompanying drawings in which like characters designate corresponding parts in all the views.

Figures 1, 2:
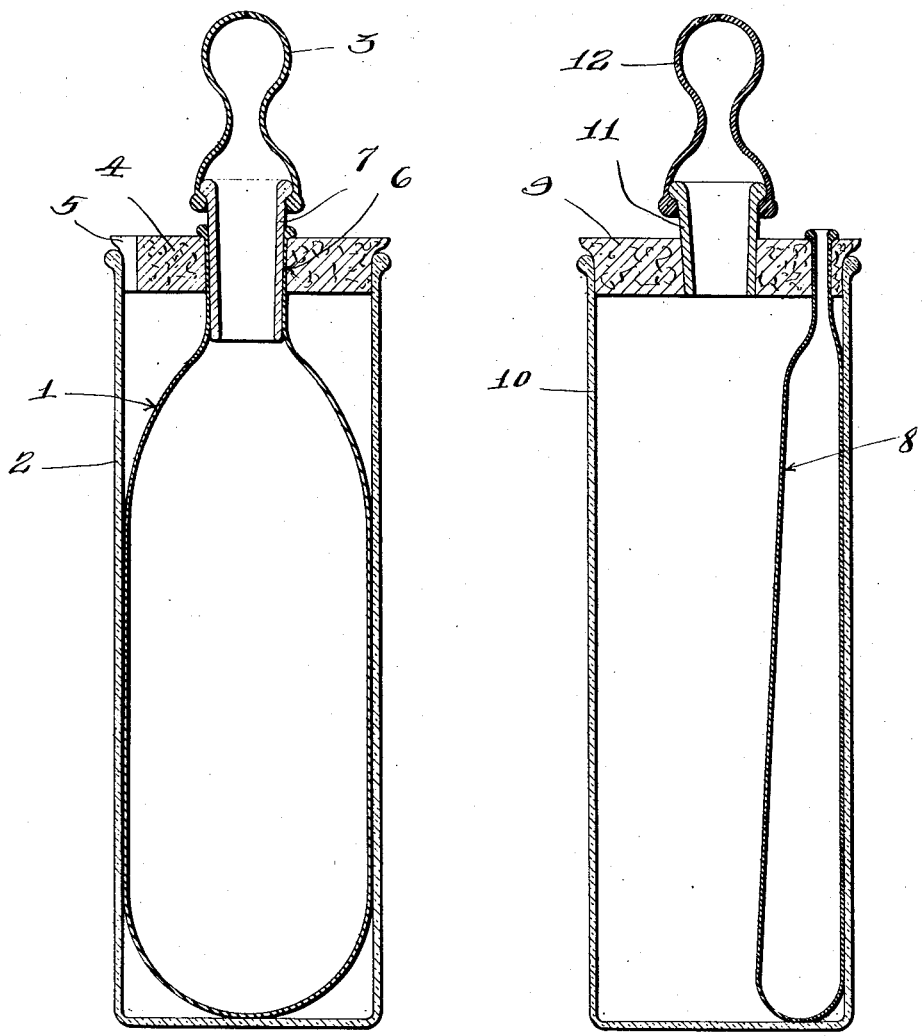
Figure 1 is an elevation partly in section of a nursing bottle embodying my invention.
Figure 2 is a view similar to Figure 1, of another embodiment of this invention.

This container comprises generally, a liquid or milk containing vessel having a flexible portion arranged so that it is acted on by outer atmospheric pressure as the liquid is withdrawn or sucked from the container and substantially conforms to the body of the liquid as the level thereof lowers in the container or vessel, so that, the liquid is displaced by the outer air which does not come in contact with the liquid.

In Figure 1, the flexible portion is shown as a collapsible sack 1, as of thin rubber, located within a suitable protector casing or cage 2, and having an ordinary nipple 3 connected to the neck of the sack 1. The protector casing or cage 2 is here shown as an ordinary nursing bottle open at its upper end, a plug or cork 4 closing the upper end, and formed with one or more air inlets 5, and also with a central opening through which the neck 6 of the sack 1 extends.

The nipple 3 is mounted upon a suitable coupling piece or tube 7 extending into the neck 6 of the sack 1, this coupling or tube 7 securing the neck 6 to the plug 4.

The nipple 3 may be of any suitable form, size and construction and constitutes a part provided with means for preventing the air from passing back into the sack 1 as the liquid or milk is withdrawn from the sack 1. The bottle or casing 2 is merely a protector for the sack 1. It also facilitates the handling of the device. A long tube may be connected to the coupling or tube 7, the long tube terminating at its outer end in a nipple.

As the milk is drawn out of the sack it collapses to conform to the body of the milk in the sack so that there is no air in the sack. Hence, regardless of the position of the container, the baby can always draw milk out of the bottle with equal facility. For instance, the bottle may be on the floor and the baby in the crib, nevertheless when the baby starts drawing on the nipple, the milk will start flowing as easily as if the bottle was above the level of the baby. The same holds true with the baby in any location as lying on its back on the floor. In no case is it necessary to hold the bottle or container.

In Figure 2, the sack 8 is suitably supported in the plug 9 at the outer end of the bottle 10, the sack 8 opening directly into the outer air. The coupling 11 on which the nipple 12 is mounted, communicates directly with the bottle 10, instead of with the sack 8.

In this construction, as the level of the milk in the bottle lowers the sack 8 expands by atmospheric pressure and conforms to the body of the milk in the bottle 10.

In the construction shown in Figure 1, when the container is so held that the contents are in the lower end of the container, the wall of the container above the body of the liquid contents collapse and tends to cut off the flow of liquid or to close the outlet of the liquid to the nipple. However, with a rubber container circular in cross section, four segments of the circle collapse inwardly substantially the same and hence when they abut against each other form a small passage. However, any means may be provided for preventing such a complete collapse of the container as to completely cut off the liquid from the nipple.

Although I have shown this container as a bottle, adapted for use as a nursing bottle, evidently it is capable of many other uses where it is necessary to keep liquid from coming in contact with the air.

What I claim is:

1. A container of the class described comprising an outer rigid receptacle, a flexible collapsible inner receptacle for receiving a liquid, each receptacle being complete in itself and the outer receptacle completely housing the inner receptacle, a detachable closure for the outer receptacle and the inner receptacle having an outlet at one end carried by said closure.

2. In a container of the class described, outer and inner receptacles, the outer receptacle being rigid and the inner receptacle flexible and collapsible, the outer receptacle having a detachable closure at one end and the inner receptacle being carried by said closure, the outer receptacle entirely enclosing the inner receptacle, one of said receptacles being a container for a liquid having an outlet provided on said closure, the inner flexible receptacle being a sack arranged to fill the outer receptacle and to be subject to atmospheric pressure to conform to the body of the liquid in the receptacle containing the liquid.

In testimony whereof, I have hereunto signed my name at Syracuse, in the county of Onondaga and State of New York, this 25th day of Sept., 1925.

LUDWIG ALVINE ZOHE.